(12) United States Patent
Reichenbach

(10) Patent No.: US 10,963,357 B2
(45) Date of Patent: Mar. 30, 2021

(54) FAULT MONITORING FOR A COMPLEX COMPUTING UNIT

(71) Applicant: Continental Automotive GmbH, Hannover (DE)

(72) Inventor: Frank Reichenbach, Regensburg (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 99 days.

(21) Appl. No.: 16/333,313

(22) PCT Filed: Sep. 5, 2017

(86) PCT No.: PCT/EP2017/072240
§ 371 (c)(1),
(2) Date: Mar. 14, 2019

(87) PCT Pub. No.: WO2018/050491
PCT Pub. Date: Mar. 22, 2018

(65) Prior Publication Data
US 2019/0243738 A1 Aug. 8, 2019

(30) Foreign Application Priority Data
Sep. 16, 2016 (DE) ...................... 10 2016 217 762.1

(51) Int. Cl.
*G06F 11/00* (2006.01)
*G06F 11/263* (2006.01)
(Continued)

(52) U.S. Cl.
CPC ....... *G06F 11/263* (2013.01); *B60W 50/0205* (2013.01); *G06F 11/00* (2013.01);
(Continued)

(58) Field of Classification Search
CPC .. G06F 11/0757; G06F 11/0739; G06F 11/30; G06F 11/0796; G06F 11/3058
See application file for complete search history.

(56) References Cited

U.S. PATENT DOCUMENTS

| 5,436,837 A | 7/1995 | Gerstung et al. ............ 701/29.2 |
| 2014/0052325 A1* | 2/2014 | Naegele .............. G06F 11/0793 |
| | | 701/29.2 |

(Continued)

FOREIGN PATENT DOCUMENTS

| DE | 37 28 561 C2 | 8/1997 | ............. F02D 41/26 |
| DE | 10 2012 207 215 A1 | 10/2013 | ............. G06F 11/16 |

(Continued)

OTHER PUBLICATIONS

German Office Action, Application No. 10 2016 217 762.1, 8 pages, dated Jun. 27, 2017.

(Continued)

*Primary Examiner* — Charles Ehne
(74) *Attorney, Agent, or Firm* — Slayden Grubert Beard PLLC

(57) ABSTRACT

Various embodiments include a control device for a vehicle with an internal fault monitoring circuit comprising: a safe computing unit executing a monitoring function for monitoring the safe computing unit and the monitoring function; and an unsafe computing unit executing the monitoring function. Monitoring the monitoring function of the safe computing unit changing the operation of the monitoring function of the safe computing unit to induce faults in the monitoring function of the unsafe computing unit. The monitoring function of the unsafe computing unit detects the induced faults in the operation of the monitoring function of (Continued)

the safe computing unit and reports the induced faults to the monitoring of the monitoring function of the safe computing unit.

8 Claims, 3 Drawing Sheets

(51) Int. Cl.
  *G06F 11/26* (2006.01)
  *G06F 11/36* (2006.01)
  *G06F 11/16* (2006.01)
  *G06F 11/07* (2006.01)
  *B60W 50/02* (2012.01)

(52) U.S. Cl.
  CPC ...... *G06F 11/0739* (2013.01); *G06F 11/0757* (2013.01); *G06F 11/16* (2013.01); *G06F 11/261* (2013.01); *G06F 11/36* (2013.01)

(56) References Cited

U.S. PATENT DOCUMENTS

| | | | |
|---|---|---|---|
| 2014/0117779 A1 | 5/2014 | Kim | ............................ 307/116 |
| 2014/0244122 A1* | 8/2014 | Inakura | ............... G06F 11/3013 |
| | | | 701/60 |
| 2015/0033357 A1* | 1/2015 | Habel | .................... G06F 21/60 |
| | | | 726/26 |

FOREIGN PATENT DOCUMENTS

| | | | | |
|---|---|---|---|---|
| DE | 10 2013 017 951 A1 | 4/2014 | ............ | B60R 16/02 |
| EP | 0 512 240 A1 | 11/1992 | ............ | B60K 26/00 |
| WO | 2018/050491 A1 | 3/2018 | ............ | G06F 11/00 |

OTHER PUBLICATIONS

International Search Report and Written Opinion, Application No. PCT/EP2017/072240, 19 pages, Nov. 27, 2017.

* cited by examiner 401    402    403    404    405

FAULT MONITORING FOR A COMPLEX COMPUTING UNIT

CROSS-REFERENCE TO RELATED APPLICATIONS

This application is a U.S. National Stage Application of International Application No. PCT/EP2017/072240 filed Sep. 5, 2017, which designates the United States of America, and claims priority to DE Application No. 10 2016 217 762.1 filed Sep. 16, 2016, the contents of which are hereby incorporated by reference in their entirety.

TECHNICAL FIELD

The present disclosure relates to complex computing units and/or systems. Various embodiments of the teachings herein may include fault monitoring for a complex computing unit, control devices having a fault monitoring circuit, vehicles, and/or methods.

BACKGROUND

Safety-critical computer programs, as are used in the automotive sector for example, have monitoring devices for protecting against faults in the computing unit. The fault monitoring circuits monitor the programs being executed and ensure that the computing unit is operating correctly. If the fault monitoring circuit determines that a computing unit is not carrying out the corresponding calculations in the intended manner, the fault monitoring circuit establishes a safe state.

So-called watchdog circuits are used, inter alia, for this purpose. The watchdog circuits periodically receive a signal from the computing unit. In some examples, the signals for the watchdog circuit must be given to the watchdog circuit by the computing unit in a predefined time window. If the signal does not arrive during the time window, the watchdog circuit changes the computing unit to a safe state and/or carries out a reset. When the circuit is reset, the original parameters are restored and the program sequence can start again. The watchdog circuits require space in the circuits and have associated costs.

SUMMARY

The teachings of the present disclosure may be embodied in various systems and methods useful to ensure the fault monitoring for a computing unit. For example, some embodiments include a control device (500) having an internal fault monitoring circuit (200) for a vehicle, having: a safe computing unit (110) which comprises operation of a monitoring function (120) for monitoring the safe computing unit (110) and monitoring of the monitoring function (125), and an unsafe computing unit (130) which has the monitoring function (135), wherein the monitoring of the monitoring function (125) of the safe computing unit (110) is designed to specifically change the operation of the monitoring function (120) of the safe computing unit (110) in order to thus induce faults in the monitoring function (135) of the unsafe computing unit (130), and wherein the monitoring function (135) of the unsafe computing unit (130) is designed to detect the induced faults in the operation of the monitoring function (120) of the safe computing unit (110) and to report the induced faults to the monitoring of the monitoring function (125) of the safe computing unit.

In some embodiments, a fault is present if the operation of the monitoring function (120) of the safe computing unit (110) does not operate the monitoring function (135) of the unsafe computing unit (130) in the defined manner, or if the monitoring function (135) of the unsafe computing unit (130) does not report the induced faults to the monitoring of the monitoring function (125) of the safe computing unit (110) in the defined manner.

In some embodiments, the monitoring function (135) of the unsafe computing unit (130) is designed, in the event of a fault in the safe computing unit (110), to detect said fault.

In some embodiments, the monitoring of the monitoring function (125) of the safe computing unit (110) is designed, in the event of a fault in the unsafe computing unit (130), to detect said fault.

In some embodiments, the fault monitoring circuit (200) is designed to change the safe computing unit (110) to a safe state in the event of a reported fault in the safe computing unit (110).

In some embodiments, the fault monitoring circuit (200) is designed to reset the safe computing unit (110) in the event of a reported fault.

As another example, some embodiments include a vehicle (501) having a control device (500) as described above.

As another example, some embodiments include a method for monitoring faults in a control device having two or more computing units, wherein at least one computing unit is a safe computing unit, and wherein at least one computing unit is an unsafe computing unit, the method comprising the following steps of: specifically changing (401) operation of a monitoring function of the safe computing unit by means of monitoring of a monitoring function of the safe computing unit in order to induce a fault in a monitoring function of the unsafe computing unit; operating (402) a monitoring function of the unsafe computing unit by means of the operation of the monitoring function of the safe computing unit, including the specifically changed contents; monitoring (403) the safe computing unit by means of the monitoring function of the unsafe computing unit and detecting faults; reporting (404) the detected induced faults to the monitoring of the monitoring function of the safe computing unit by the monitoring function of the unsafe computing unit; and establishing (405) a safe state of the safe computing unit if a non-induced fault is detected by the monitoring function of the unsafe computing unit or if the induced fault is not detected by the monitoring function of the unsafe computing unit.

As another example, some embodiments include a program element which, when executed on a control device having two or more computing units, instructs the control device to carry out the methods described above.

As another example, some embodiments include a computer-readable medium on which a program element as described above is stored.

BRIEF DESCRIPTION OF THE DRAWINGS

Further features, advantages, and possible uses of the teachings herein emerge from the following description of the exemplary embodiments and figures. The figures are schematic and are not true to scale. If the same reference signs are stated in the following description in various figures, they denote identical or similar elements.

DETAILED DESCRIPTION

Figure 1:
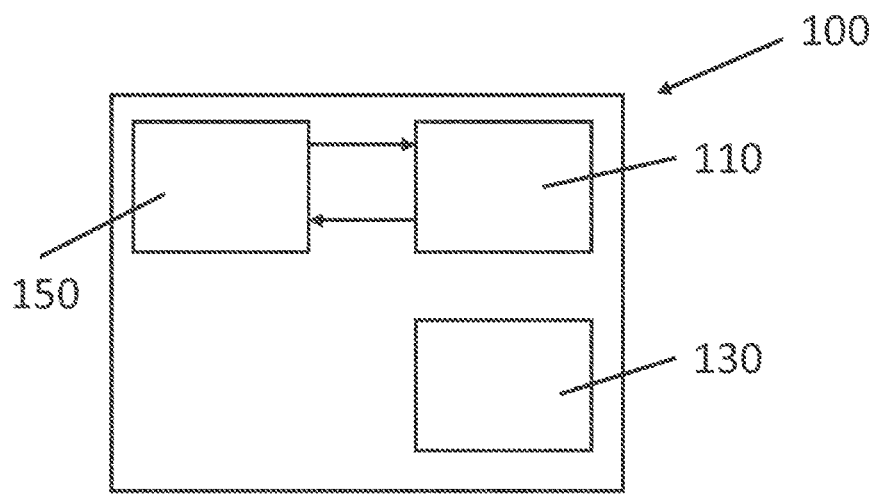
FIG. 1 shows a control device having a fault monitoring circuit by means of an external watchdog circuit.

Various embodiments of the teachings herein include a fault monitoring circuit of a control device for a vehicle. In this case, at least one computing unit is a safe computing unit which comprises operation of a monitoring function and monitoring of a monitoring function. Furthermore, at least one computing unit of the complex computing unit may be an unsafe computing unit which comprises a monitoring function for monitoring the safe computing unit. The monitoring of the monitoring function of the safe computing unit specifically changes the operation of the monitoring function of the safe computing unit in order to induce faults in the monitoring function of the unsafe computing unit. The induced faults may be, for example, the failure of the operation or the incorrect operation, for example outside the time window. The monitoring function of the unsafe computing unit must detect the induced faults in the operation of the monitoring function of the safe computing unit and must report them to the monitoring of the monitoring function of the safe computing unit.

In other words, an unsafe computing unit can undertake the tasks of an external watchdog circuit. The unsafe computing unit monitors the safe computing unit and ensures that the latter is operating correctly. If the unsafe computing unit detects a fault in the safe computing unit, the unsafe computing unit can change the safe computing unit to a safe state and/or can restart the safe computing unit, which is also referred to as a reset. The special feature is that the safe computing unit for its part monitors the unsafe computing unit in order to ensure that the monitoring functionality of the unsafe computing unit is available. In order to carry out the fault monitoring, a complex computing unit may comprise at least two computing units, at least one computing unit of which is a safe computing unit, and a second computing unit can be used to monitor the safe computing unit.

A program element which has the functionality of a monitoring process can be operated on the unsafe computing unit as the fault monitoring circuit. This program element is referred to as a "monitoring function" below.

In some embodiments, there are three different possible implementations for operating the monitoring function and for operating the monitoring of the monitoring function. Firstly, the operation of the monitoring function and the operation of the monitoring of the monitoring function can be carried out in a defined time window, that is to say the respective function must be operated by the function to be monitored in a predefined time window. Secondly, the function can be operated by the function to be monitored until a particular time, that is to say a timer begins to run as soon as the monitoring function has been operated and the monitoring function must be operated again before the timer expires. A third possibility involves the operation of the monitoring function not consisting of a pure heartbeat signal, but rather a task having to be specifically tackled, wherein the results of the task of the function to be monitored and of the monitoring function are compared, that is to say the monitoring function and the function to be monitored perform the same task and the respective results must correspond.

The first possibility mentioned is also subsequently restricted in order to prevent repetitions. The teachings herein are therefore explained, by way of example, for all three possible implementations using the operation of the monitoring function in a predefined time window. However, the present teachings can be implemented with all three possible implementations or any desired mixed forms of the three possible implementations.

The monitoring function expects a signal from the computing unit to be monitored at predefined, for example periodic, intervals of time. If the signal is transmitted in the defined time window, it can be assumed that the computing unit to be monitored is operating correctly. If a signal is not received from the computing unit to be monitored in the defined time window, it can be assumed that the computing unit to be monitored, the safe computing unit in this case, is no longer carrying out its processes correctly. In particular, provision may be made for the monitoring function to change the computing unit to be monitored to a safe state in this case or to restart it by means of a reset. On account of the fact that the situation in which the monitoring function on the unsafe computing unit fails is not excluded, the unsafe computing unit can be monitored by the safe computing unit.

In order to ensure the fault monitoring, at least two program elements are executed on the safe computing unit. One program element is referred to below as "operation of the monitoring function". This program element is used to supply the monitoring function on the unsafe computing unit with the required signals at defined periodic intervals. The second program element is referred to as "monitoring of the monitoring function" and is used to monitor the monitoring function of the unsafe computing unit. The monitoring of the monitoring function of the safe computing unit cyclically changes the operation of the monitoring function of the safe computing unit. As a result, faults are specifically induced in the monitoring function of the unsafe computing unit. The induced faults may be, for example, the omission of the operation of the monitoring function or the delayed operation of the monitoring function.

The monitoring function of the unsafe computing unit must detect the induced faults and must report the detected faults back to the monitoring of the monitoring function of the safe computing unit in a defined response time via an information line or a bus. The feedback may be effected using a fault message, for example. If there is no feedback from the monitoring function of the unsafe computing unit to the monitoring of the monitoring function of the safe computing unit, it can be assumed that the monitoring function of the unsafe computing unit is no longer operating correctly. Since it is likely in this case that the monitoring function of the unsafe computing unit is no longer operating correctly, the safe operation of the safe computing unit can no longer be guaranteed. In this case, provision may be made for the monitoring of the monitoring function to change the safe computing unit to a safe state and/or to restart the safe computing unit by means of a reset and to therefore reset the safe computing unit to the original parameters.

The restarting or changing of the safe computing unit to a safe state is typically carried out after more than one fault, with the result that the monitoring function of the unsafe computing unit can report the detected fault to the monitoring of the monitoring function on the safe computing unit. A counter for counting the faults which have occurred may be provided for this purpose in the monitoring function and in the monitoring of the monitoring function. As soon as the counter exceeds a defined threshold value or a certain number of faults have occurred in a particular period, the safe computing unit is restarted or changed to a safe state. Using a counter makes it possible to prevent the situation in which the safe computing unit is restarted for each fault which occurs, in particular the induced faults.

The omission of the external watchdog circuit makes it possible to save installation space. No additional components are required since the complex computing unit generally already has all components required for the monitoring. The communication paths between the individual computing units are also generally already available in a complex computing unit. The computing capacities required for executing these methods on the two or more computing units can be kept very low. The signals for the safe computing unit to be monitored arise at periodic intervals of time and therefore do not permanently require computing power. Resources can also be sparingly implemented for the monitoring of the monitoring function since the latter generally only makes the changes to the operation of the monitoring function and receives the fault messages from the monitoring function.

The terms "safe" and "unsafe" computing unit do not relate to the actual safety of the individual electrical components but rather to the fact that the safe computing unit and the program elements executed on the latter are certified, for example, according to ISO26262 (or other safety standards such as IEC 61508) and the specifications set according to this standard are complied with. The unsafe computing unit generally does not have any certification according to ISO26262.

A fault is referred to if the monitoring function of the unsafe computing unit is not operated, as expected, by the operation of the monitoring function of the safe computing unit in the predefined time window. Another fault is present if the monitoring function of the unsafe computing unit does not detect a fault induced by the monitoring of the monitoring function of the safe computing unit or does not report this fault back to the monitoring of the monitoring function of the safe computing unit in the predefined time window.

In some embodiments, the monitoring function of the unsafe computing unit, in the event of a fault in the safe computing unit, detects said fault and reports said fault. The monitoring function of the unsafe computing unit can detect the faults in the safe computing unit and can report said faults. The operation of the monitoring function of the safe computing unit transmits a signal to the monitoring function of the unsafe computing unit at defined periodic intervals. As soon as the monitoring function does not receive the signal or does not receive the signal as required, the monitoring function can assume a fault in the program sequence of the safe computing unit. The detected fault can be detected and reported by the monitoring function of the unsafe computing unit.

In the event of a fault in the unsafe computing unit, another embodiment provides for this fault to be detected by the monitoring of the monitoring function of the safe computing unit. The safe operation of the safe computing unit is no longer ensured as a result of a fault in the monitoring function. In the event of a fault in the monitoring function on the unsafe computing unit, the unsafe computing unit can also no longer be monitored for faults. In this case, the fault monitoring of the unsafe computing unit can be carried out by the safe computing unit, that is to say by the computing unit to be monitored. For this purpose, the monitoring of the monitoring function of the safe computing unit changes the operation of the monitoring function of the safe computing unit in order to thus specifically induce faults in the monitoring function of the unsafe computing unit. The monitoring function of the unsafe computing unit must detect the induced faults and must report the detected faults to the monitoring of the monitoring function of the safe computing unit. The induced faults may be, for example, the failure of the operation or the incorrect operation, for example outside the time window. If an induced fault is not reported to the monitoring of the monitoring function of the safe computing unit, it can be assumed that the monitoring function of the unsafe computing unit is no longer operating correctly. This abnormal behavior of the unsafe computing unit can be detected by the monitoring of the monitoring function of the safe computing unit.

In some embodiments, the safe computing unit to be changed to a safe state in the event of a detected fault. As soon as a fault has been detected, the safe computing unit can be changed to a safe state. The detected fault can be detected both by the monitoring function of the unsafe computing unit and by the monitoring of the monitoring function of the safe computing unit. The safe state describes a basic state in which the correct, safe operation of the components controlled by the control device is ensured. The restarting or changing of the safe computing unit to a safe state need not necessarily be carried out after the first detected fault; provision may be made, in particular, for a counter for counting the faults which have occurred to be provided in the monitoring function and in the monitoring of the monitoring function. As soon as the counter exceeds a defined threshold value or a certain number of faults have occurred in a particular period, the safe computing unit is restarted or changed to a safe state.

In some embodiments, the safe computing unit may be restarted in the event of a reported fault. As soon as a fault has been reported, the safe computing unit can be changed to a safe state. In this case, the safe state is established by restarting the computing unit. As a result of the safe computing unit being restarted, the original data are loaded and the program sequence on the safe computing unit can start again.

In some embodiments, a vehicle includes a control device described above and below. The vehicle comprises, for example, a motor vehicle, such as an automobile, a bus or a truck, or else a rail vehicle, a ship, an aircraft, such as a helicopter or an airplane, or for example a bicycle.

In some embodiments, the described control device with at least two computing units, at least one computing unit of which is a safe computing unit, can be installed in a vehicle. The fault monitoring can also be used in many different control devices and electronic circuits. This fault monitoring can also be used in non-safety-critical electronic circuits. The control device can also be in the form of a PC, a mobile telephone or a tablet.

Some embodiments include a method for monitoring faults in a control device having two or more computing units, wherein at least one computing unit is a safe computing unit, and wherein at least one computing unit is an unsafe computing unit. The method provides for operation of a monitoring function of the safe computing unit to be specifically changed by means of monitoring of a monitoring function of the safe computing unit in order to induce a fault in the monitoring function of the unsafe computing unit.

The method also provides for the monitoring function of the unsafe computing unit to be operated in a predefined time window by means of the operation of a monitoring function of the safe computing unit, including the specific changes. The induced faults may be, for example, the failure of the operation or the incorrect operation, for example outside the time window. Further parts of the method are: monitoring the safe computing unit by means of the monitoring function of the unsafe computing unit, detecting faults, reporting the detected induced faults to the monitoring of the monitoring function of the safe computing unit by the monitoring function of the unsafe computing unit, and establishing a safe state of the safe computing unit if a non-induced fault is detected by the monitoring function of the unsafe computing unit or if the induced fault is not detected by the monitoring function of the unsafe computing unit.

The method for monitoring faults in a safe computing unit without an external watchdog circuit can be described as follows. A complex computing unit having two or more computing units is needed to apply the method. At least one of these computing units is a safe computing unit certified according to ISO26262. The program elements for operating the monitoring function and for monitoring the monitoring function are executed on the safe computing unit. The program element for monitoring the safe computing unit is executed on the unsafe computing unit. In some embodiments, the program element for monitoring the monitoring function of the safe computing unit to specifically change the actual operation of the monitoring function of the safe computing unit in order to thus induce faults in the monitoring function of the unsafe computing unit, for the induced faults to be detected by the monitoring function and to be reported back to the program element for monitoring the monitoring function. If there is feedback from the unsafe computing unit, the safe operation of the safe computing unit is provided. If a non-induced fault is detected by the monitoring function or if an induced fault is not detected, operation which is no longer correct can be assumed. The safe computing unit is therefore changed to a safe state and/or is restarted. This method makes it possible to ensure safe operation of the safe computing unit without the need for an external watchdog circuit.

Some embodiments include a program element which, when executed by a control device, instructs the control device to carry out the method described in the context of the present invention. In some embodiments, there is a computer-readable medium, on which a computer program is stored, which, when executed by a control device, instructs the control device to carry out the method described in the context of the present disclosure.

FIG. 1 shows a circuit 100 having a safe computing unit 110, an unsafe computing unit 130, and a watchdog circuit 150. The safe computing unit 110 transmits a periodic signal to the watchdog circuit 150 in a predefined time window. If the watchdog circuit 150 determines that the signal has not been given within the predefined time window, the watchdog circuit changes the safe computing unit 110 to a safe state and/or causes an external reset of the safe computing unit 110. As a result of the safe computing unit 110 being reset, the original configuration of the safe computing unit 110 is loaded and the program sequence starts again. As a result of the external watchdog circuit 150, space is additionally required in the circuit 100, which in turn results in higher costs.

Figure 2:
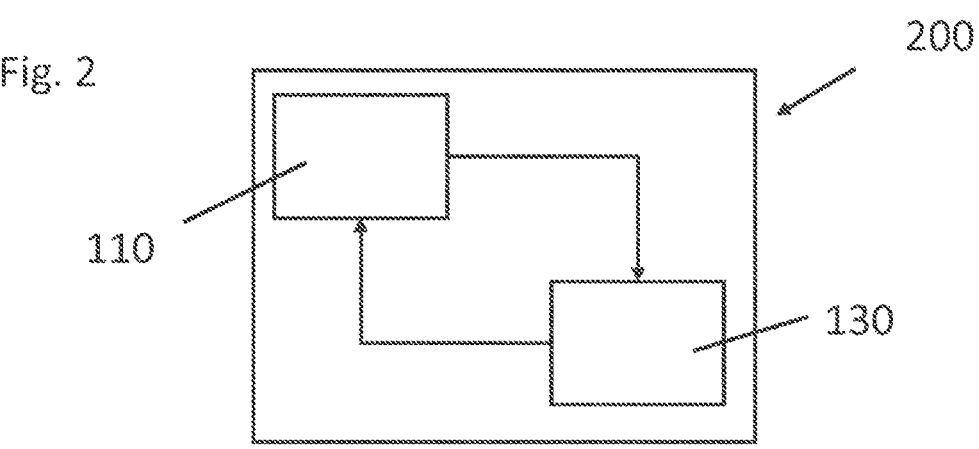
FIG. 2 shows a fault monitoring circuit for a control device incorporating the teachings of the present disclosure, without an external watchdog circuit.

FIG. 2 shows a circuit 200 having a safe computing unit 110 and an unsafe computing unit 130. In this embodiment, the safe computing unit 110 is monitored by the unsafe computing unit 130. In this case, the unsafe computing unit 130, and the safe computing unit 110 undertake the tasks of the watchdog circuit 150. The safe computing unit 110 is monitored by the unsafe computing unit 130 and the latter is in turn monitored by the safe computing unit 110. In other words, the two computing units 110, 130 monitor each other.

As soon as a fault is determined, the safe computing unit 110 is changed to a safe state and/or an external reset of the safe computing unit 110 is prompted. As a result of the safe computing unit 110 being reset, the original configuration of the safe computing unit 110 is loaded and the program sequence starts again. This integration of the functionality in the two computing units makes it possible to dispense with an external watchdog circuit. This saves costs and space in the circuit 200.

Figure 3:
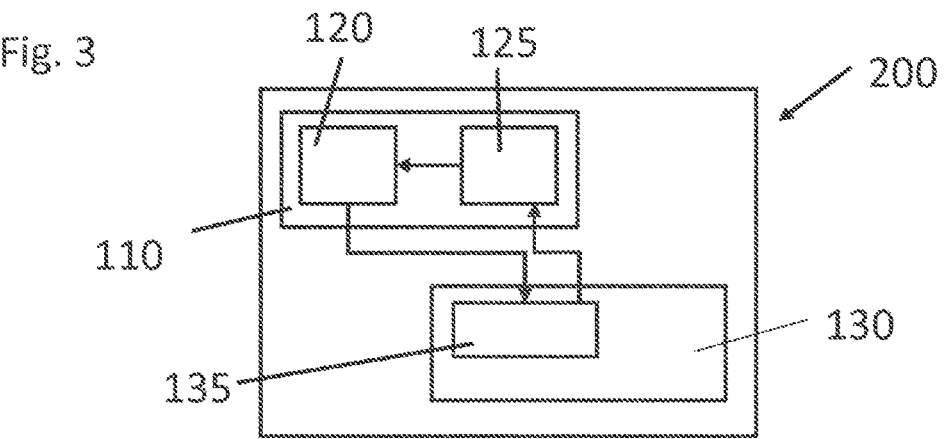
FIG. 3 shows a more detailed illustration of a fault monitoring circuit for a control device incorporating the teachings of the present disclosure.

FIG. 3 shows a detailed view of the structure according to FIG. 2. Two program elements are executed in the safe computing unit 110.

One program element is referred to as operation of the monitoring function 120 and the other program element is referred to as monitoring of the monitoring function 125. A program element which is the monitoring function 135 is present in the unsafe computing unit 130. The monitoring function 135 in the unsafe computing unit 130 undertakes the tasks of the watchdog circuit 150 from FIG. 1 together with the monitoring of the monitoring function 125. The safe computing unit 110 must transmit the signal for operating the monitoring function 120 to the monitoring function 135 of the unsafe computing unit 130 in a predefined time window. If the signal is absent, the unsafe computing unit 130 prompts the safe computing unit 110 to be changed to a safe state and/or resets the safe computing unit 110.

In order to exclude the situation in which, in the event of a fault in the unsafe computing unit 130, a fault which subsequently occurs in the safe computing unit 110 results in failure of the complete system, the operation of the monitoring function 120 is specifically changed by the monitoring of the monitoring function 125 on the safe computing unit 110 in order to induce faults in the monitoring function 135 on the unsafe computing unit 130. The induced faults must be detected by the monitoring function 135 on the unsafe computing unit 130 and must be reported back to the monitoring of the monitoring function 125 on the safe computing unit 110. If there is no feedback from the monitoring function 135 on the unsafe computing unit 130 in a predefined time window, it is assumed that the monitoring function 135 on the unsafe computing unit 130 is no longer operating correctly. The monitoring of the monitoring function 125 therefore prompts the safe computing unit 110 to be changed to a safe state and/or prompts the reset of the safe computing unit 110. It is therefore ensured that the functionality of a safe computing unit 110 is provided even without an external watchdog circuit.

Figure 4:
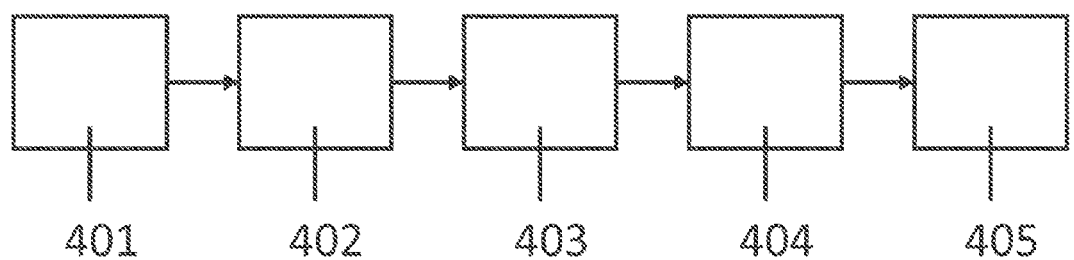
FIG. 4 shows a flowchart for a method for monitoring faults incorporating the teachings of the present disclosure.

FIG. 4 shows a flowchart for a method incorporating teachings of the present disclosure. Step 401 describes a specific change in operation of a monitoring function of the safe computing unit by means of monitoring of a monitoring function of the safe computing unit in order to specifically induce faults in the monitoring function of the unsafe computing unit. Step 402 describes the operation of the monitoring function of the unsafe computing unit by means of the safe computing unit, including the changed signal. Step 403 is used to monitor the safe computing unit by means of the monitoring function of the on safe computing unit and to detect the faults. In step 404, the detected faults which have been detected by the monitoring function of the unsafe computing unit are reported to the monitoring of the monitoring function of the safe computing unit. In step 405, a safe state of the safe computing unit is established if a non-induced fault is detected by the monitoring function of the unsafe computing unit or if the induced faults are not detected by the monitoring function of the unsafe computing unit.

Figure 5:
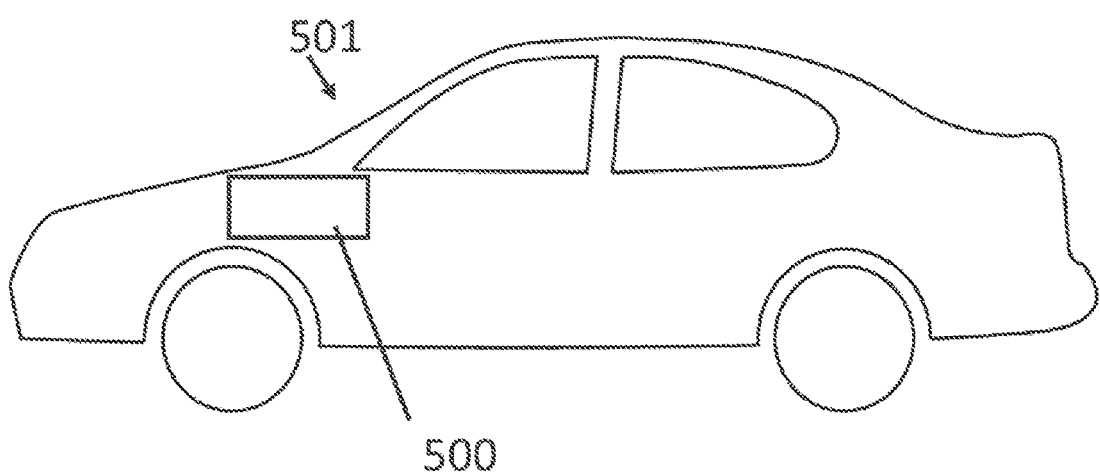
FIG. 5 shows a vehicle having a control device with a fault monitoring circuit incorporating the teachings of the present disclosure.

FIG. 5 shows a vehicle 501 having a control device 500 with a fault monitoring circuit 200 incorporating the teachings of the present disclosure. The fault monitoring circuit has a safe computing unit 110 and an unsafe computing unit 130 for monitoring the safe computing unit 110.

Figure 6:
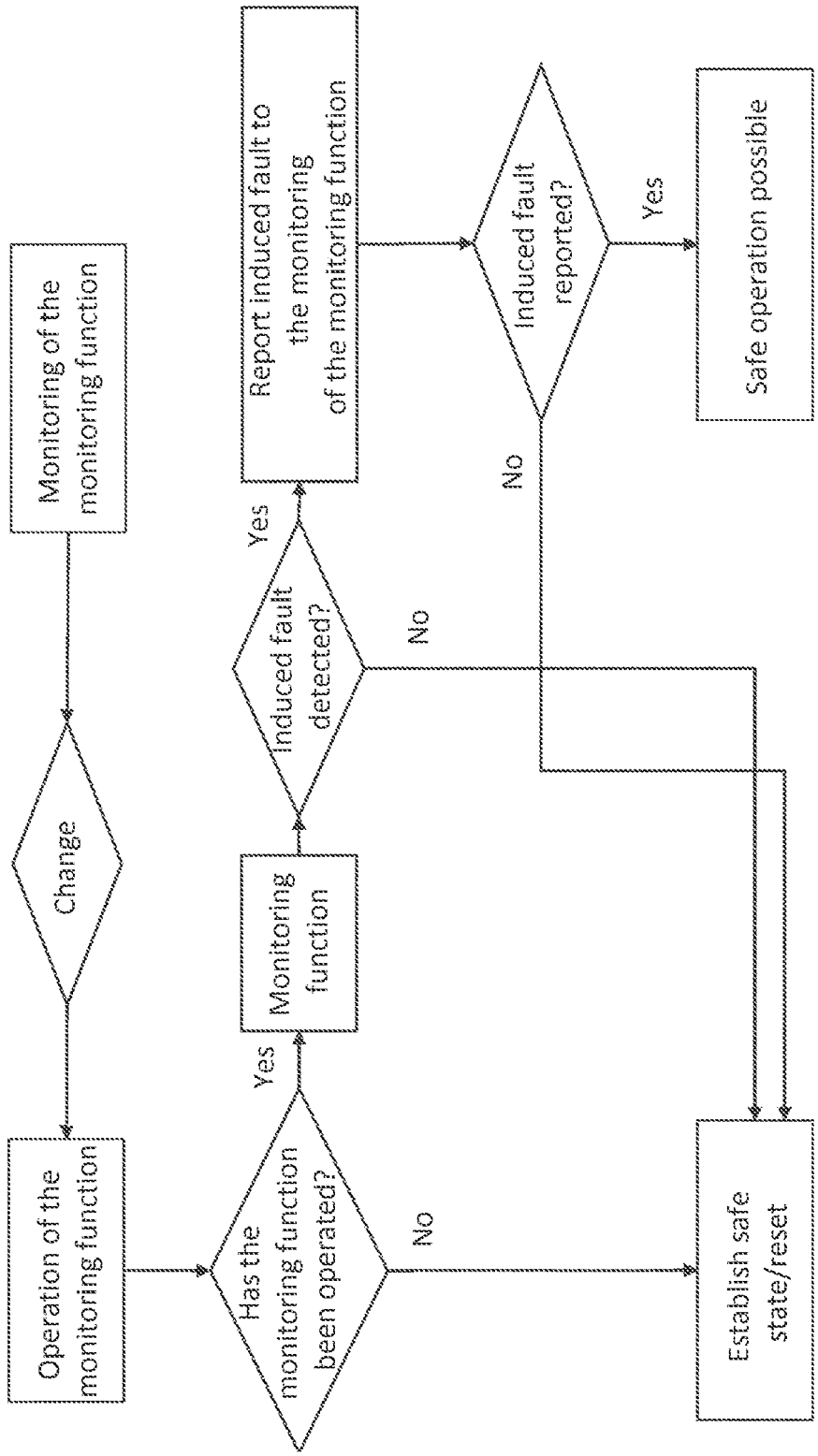
FIG. 6 shows a flowchart of a method for monitoring faults, including decision paths incorporating the teachings of the present disclosure.

FIG. 6 shows a flowchart in which the sequence of the example methods is explained in more detail. In particular, it becomes clear therefrom how the individual decisions are handled in the event of a fault or how it is ensured that the safe operation of the safe computing unit is ensured. The monitoring of the monitoring function changes the operation of the monitoring function. The operation of the monitoring function then operates the monitoring function at periodic intervals of time. If the monitoring function is not operated, a safe state of the safe computing unit is established and/or a reset is carried out.

If the monitoring function is correctly operated by the operation of the monitoring function, the monitoring function must detect the changes by the monitoring of the monitoring function in the operation of the monitoring function. If the monitoring function does not detect the faults, the safe state is established and/or the reset is carried out. If a fault is detected, it must be reported to the monitoring of the monitoring function. If a message is not provided or if the message is provided outside the time window, the safe state is established, and/or a reset is carried out. If the monitoring function has been operated within the time window, the monitoring function has detected and reported the fault and save operation is ensured.

What is claimed is:

1. A control device for a vehicle with an internal fault monitoring circuit, the control device comprising:
a safe computing unit executing a first monitoring function for monitoring the safe computing unit and a second monitoring function for monitoring the first monitoring function; and
an unsafe computing unit executing a third monitoring function;
wherein the second monitoring function includes changing the operation of the first monitoring function of the safe computing unit to induce faults in the third monitoring function; and
the third monitoring function detects the induced faults in the operation of the first monitoring function and reports the induced faults to the second monitoring function.

2. The control device as claimed in claim 1, wherein a fault exists if:
the operation of the second monitoring function does not induce faults in the third monitoring function in the defined manner, or
the third monitoring function does not report the induced faults to the second monitoring function in the defined manner.

3. The control device as claimed in claim 1, wherein the third monitoring function detects, in the event of a fault in the safe computing unit, said fault.

4. The control device as claimed in claim 1, wherein the second monitoring function includes, in the event of a fault in the unsafe computing unit, detecting said fault.

5. The control device as claimed in claim 1, wherein the fault monitoring circuit changes the safe computing unit to a safe state in the event of a reported fault in the safe computing unit.

6. The control device as claimed in claim 1, wherein the fault monitoring circuit resets the safe computing unit in the event of a reported fault.

7. A vehicle comprising:
a controller monitoring and controlling operation of the vehicle;
an internal fault monitoring circuit;
a safe computing unit executing a first monitoring function for monitoring the safe computing unit and a second monitoring function for monitoring the first monitoring function; and
an unsafe computing unit executing a third monitoring function;
wherein the second monitoring function includes changing the operation of the first monitoring function of the safe computing unit to induce faults in the third monitoring function; and
the third monitoring function detects the induced faults in the operation of the first monitoring function and reports the induced faults to the second monitoring function.

8. A method for monitoring faults in a control device with two computing units, wherein a first computing unit comprises a safe computing unit and a second computing unit comprises an unsafe computing unit, the method comprising:
specifically changing operation of a first monitoring function of the safe computing unit using a second monitoring function of the safe computing unit in order to induce a fault in a third monitoring function of the unsafe computing unit;
operating the third monitoring function of the unsafe computing unit using the second monitoring function, including the specifically changed contents;
monitoring the safe computing unit with the third monitoring function and detecting faults;
reporting the detected induced faults to the second monitoring function from the third monitoring function; and
establishing a safe state of the safe computing unit if a non-induced fault is detected by the third monitoring function or if the induced fault is not detected by the third monitoring function.

* * * * *